United States Patent [19]

Marcil

[11] 4,399,859
[45] Aug. 23, 1983

[54] DIECASTING ASSEMBLY

[75] Inventor: Jacques N. Marcil, Warren, Mich.

[73] Assignee: Ford Motor Company, Dearborn, Mich.

[21] Appl. No.: 206,429

[22] Filed: Nov. 13, 1980

[51] Int. Cl.[3] .................... B22D 17/26; B22D 17/00; B22D 17/04; B22D 17/22
[52] U.S. Cl. ................................ 164/342; 164/306; 164/312; 164/344
[58] Field of Search ............... 164/312, 314, 341, 342, 164/306, 309, 316, 318, 339, 264, 344

[56] References Cited

U.S. PATENT DOCUMENTS

| | | | |
|---|---|---|---|
| 1,389,722 | 9/1921 | Webb . | |
| 1,797,041 | 3/1931 | Becker | 164/309 |
| 1,886,084 | 11/1932 | Clawson . | |
| 3,199,159 | 8/1965 | Wernecke | 164/341 |
| 3,506,061 | 4/1970 | Clemm | 164/264 |

FOREIGN PATENT DOCUMENTS 1057293 5/1959 Fed. Rep. of Germany .
662241 5/1979 U.S.S.R. .

Primary Examiner—Nicholas P. Godici
Assistant Examiner—Jerold L. Johnson
Attorney, Agent, or Firm—Joseph W. Malleck; Olin B. Johnson

[57] ABSTRACT

A multiple casting die assembly, useful for receiving injected molten metal under pressure, is disclosed. Plural pairs of mating die members are abuttingly arranged in series; the parting plane for each pair of die members is generally arranged to bisect each of the casting cavities resulting in mating cavity portions that meet at the parting plane. Means are provided for clamping the die members in series and for forceably separating the die members which automatically severs the sprue. The clamping force is reduced to that needed for only one casting cavity and cycle time is decreased for withdrawal and ejection of sound die cast bodies.

3 Claims, 9 Drawing Figures

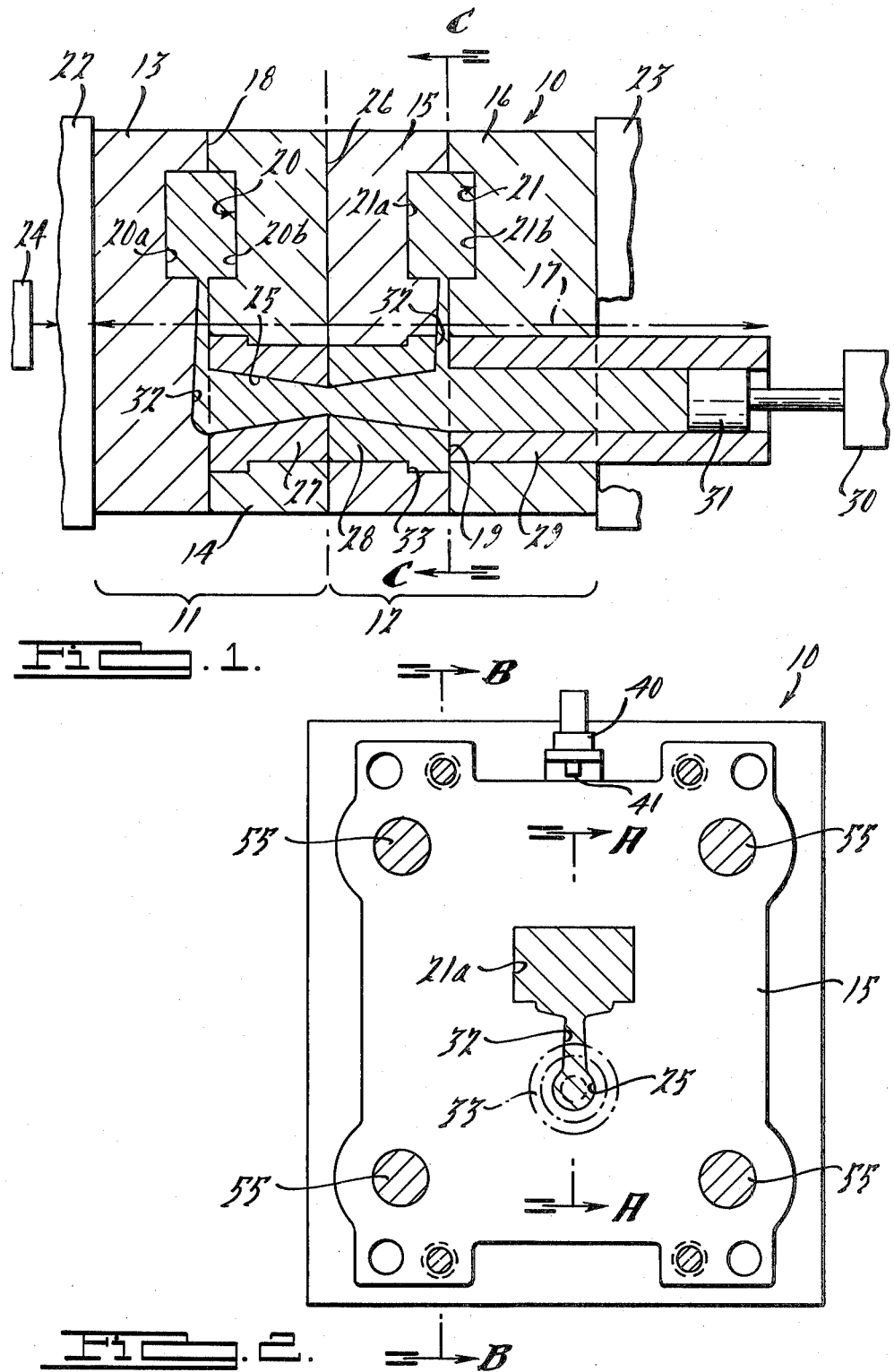

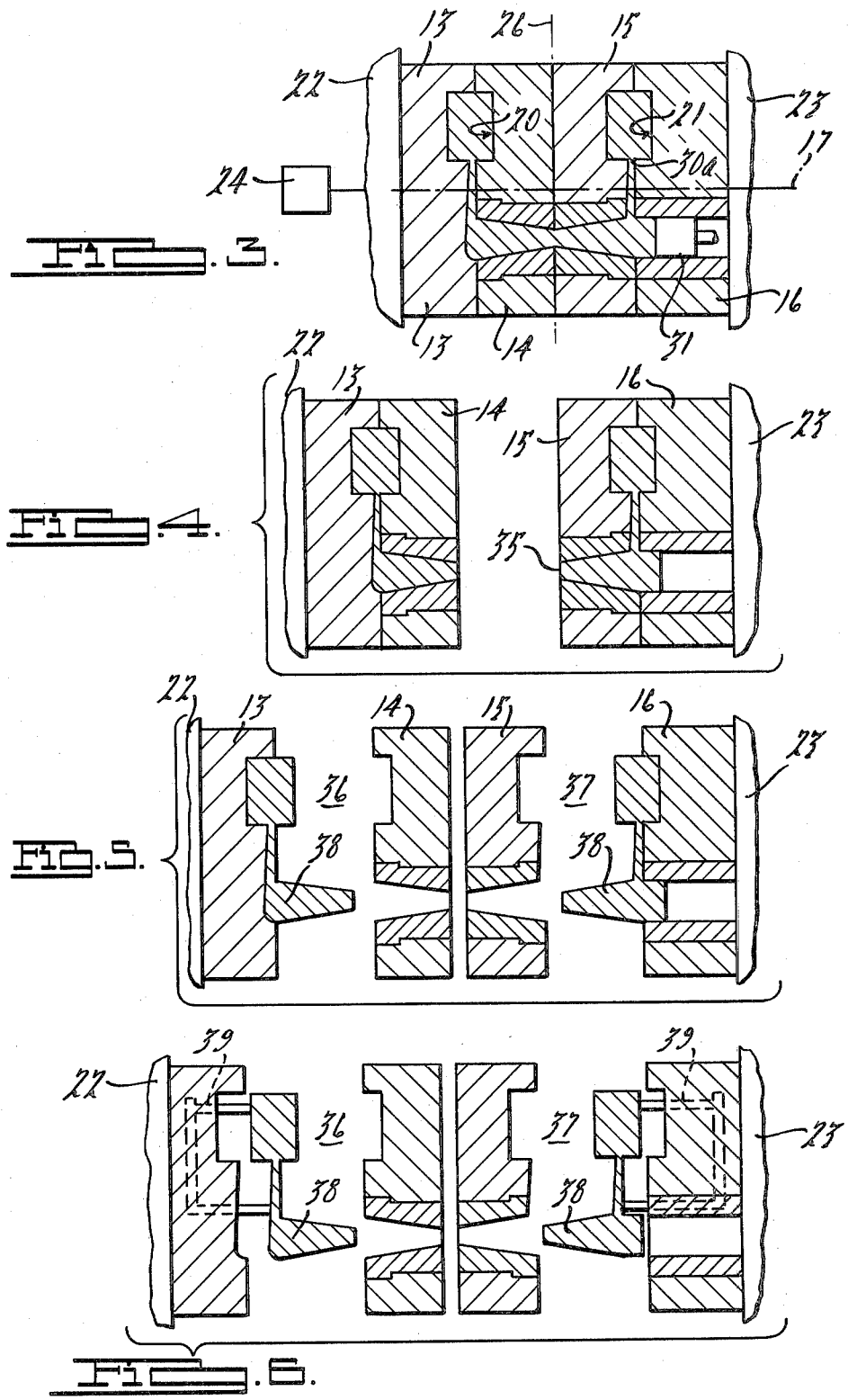

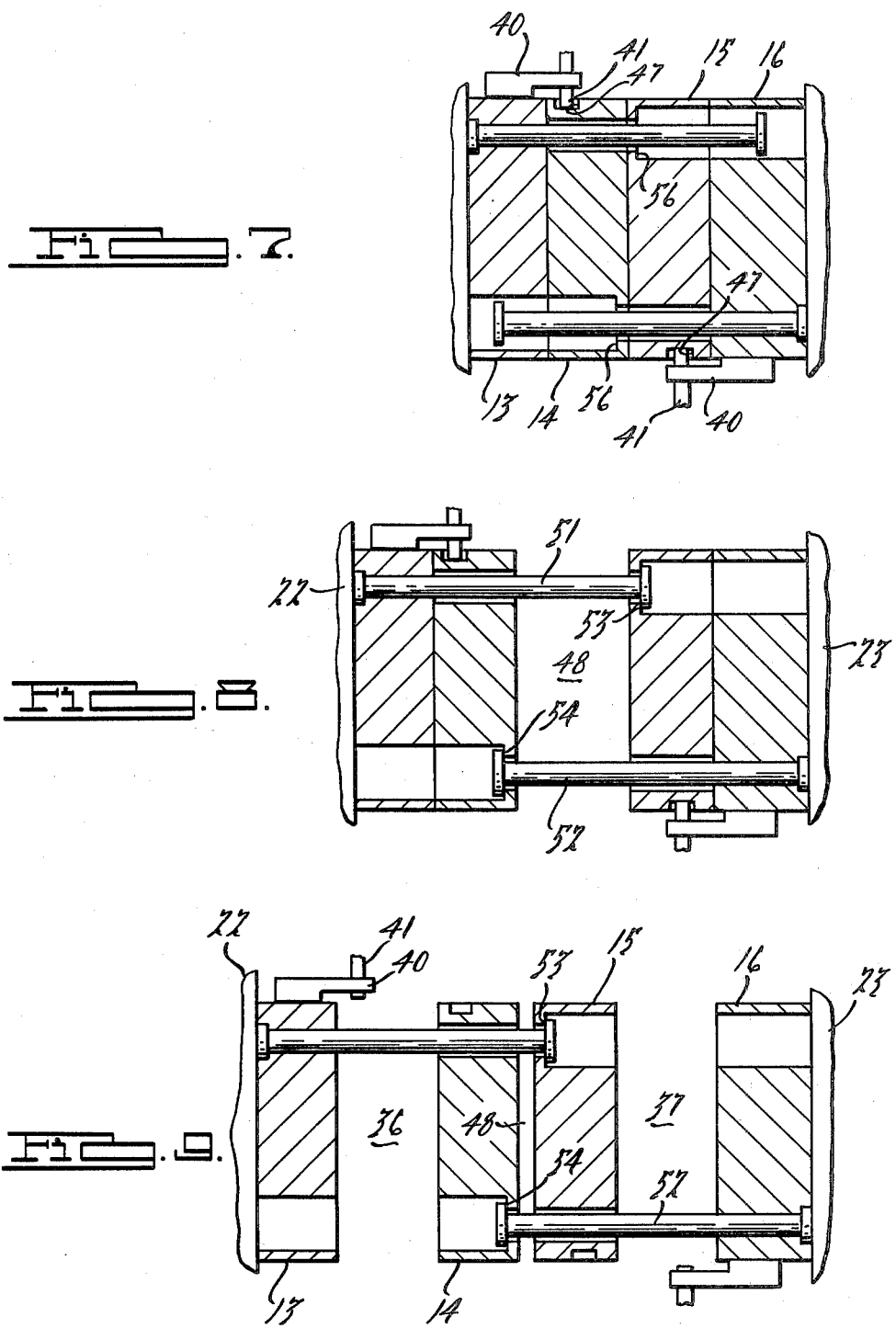

DIECASTING ASSEMBLY

BACKGROUND OF THE INVENTION

Diecasting requires injection of pressurized molten metal into an assembly comprised of separable die members, each of which are constructed to withstand the internal hydraulic pressures generated by such injection when held together with sufficient force. The forces required to hold the die members together will be the resultant of the area of the casting cavity, projected on the parting plane of the die members, multiplied by the pressure of the injected metal that attempts to force the die members apart. It is this separating force that must be resisted by the locking mechanism of the casting assembly.

If two separate casting cavities or impressions are oriented side-by-side on the same parting plane of the die assembly (which is common practice for multiple casting cavities in accordance with prior art technology), and commonly injected with molten metal, the separating force will be double. These multiplying forces become unduly large when increasing numbers of castings are desired to be made in one assembly. Without modification of the diecasting assembly to reduce or withstand such forces, the advantage of higher productivity cannot be obtained.

SUMMARY OF THE INVENTION

The invention is a multiple casting die assembly useful for receiving injected molten metal under pressure. The assembly is effective to maintain the separating forces for the die members generally equal to that associated with only one casting cavity and to allow for quick severence and separation of the multiple castings upon solidification of the cast metal.

Plural pairs of mating die members are abuttingly arranged in series along a predetermined clamping axis (stacked). The parting plane for each pair of die members is generally arranged to bisect each of the casting cavities resulting in mating cavity portions that meet at the parting plane. The die members have walls cooperating to define a sprue extending perpendicular to and through the pairs of die members. The assembly has means for selectively clamping the die members in said abutting series arrangement along said axis and for forceably separating the die members subsequent to a casting cycle to break the cast metal within said sprue at generally the planes of abutment of the pairs of die members.

The alignment of casting cavity portions neutralizes some of the hydraulic pressure acting on the cavities and thus reduces the clamping force to hold the die members tightly together (called locking tonnage). But equally important, the die assembly also provides for decreased cycle time in the withdrawal and ejection of sound die cast bodies.

To facilitate the breaking away of the cast metal residing within the sprue that transcends each of the pairs of die members, it is preferable to provide in the sprue a narrowed neck portion at each of the abutting planes separating the pairs of die members. The sprue member is more easily fractured upon forceable separation of the pairs of die members; this prepares the pairs of die members for subsequent separation of individual die members.

DESCRIPTION OF THE DRAWINGS

FIG. 1 is a central sectional elevational view of a multiple casting die assembly in accordance with the principles of this invention and taken along along plane A—A of FIG. 2;

FIG. 2 is a sectional view taken substantially along line C—C of FIG. 1;

FIGS. 3 to 6 are a series of schematic sectional views of the die assembly of FIG. 2, taken along plane A—A, showing different stages of operation during a typical casting cycle; and FIGS. 7 to 9 represent schematic sectional views, taken along plane B—B of FIG. 2, showing in sequence the operation of the die assembly, particularly illustrating the locking and separating mechanism for the assembly.

DETAILED DESCRIPTION

A preferred mode for this invention is illustrated in FIGS. 1 and 2, with the operative sequence of such preferred mode being shown in FIGS. 3 to 9. The multiple casting die assembly 10 comprises plural pairs (11 and 12) of die members 13, 14, 15 and 16. The die members are arranged in series along a predetermined clamping axis 17. The ability of the die cast machine to resist hydraulic pressures induced in a casting impression by the injection pressure of the injected molten meal is called "locking tonnage." The locking tonnage is imparted to the series of die members by platens 22 and 23, one of which may be fixed and the other of which is urged toward the other along the clamping axis 17 by suitable means 24.

The area of the casting impression projected on the parting plane, multiplied by the pressure of the injected metal, is the force which the machine must resist. If two casting cavities or impressions are cut side-by-side on the same parting plane of a die, the internal pressure acting against the clamping tonnage would be doubled. If the same two cavities were cut on separate dies and the dies placed on opposite sides of a stationary plate, then the pressure developed would be the same as a single cavity impression, since the pressure developed or acting toward the stationary plate would cancel out. By this method, the capacity of the die casting machine can be doubled and, of course, increasing the number of casting cavities beyond two in the same general arrangement would multiply the capacity of the machine in the same proportion without affecting locking tonnage.

The parting plane (18 or 19) for each pair (11 or 12) of die members, is generally arranged to bisect the full casting cavity (20 or 21) resulting in mating cavity portions (20a and 20b, or 21a and 21b, respectively) that meet at the parting plane.

Walls 25 in each of the die members 14, 15 and 16 define cooperatively a sprue channel 25. The sprue channel is arranged to extend perpendicular to each of the parting planes 18 and 19 as well as through the abutting plane 26. Such sprue channel may be conveniently defined by machining a cylindrical channel through separate insertable blocks of metal 27, 28 and 29, two of which have shoulders 33 for positive insertion with the respective die members 14, and 15. The sprue channel 25 forms the common or central means for carrying molten metal, injected under pressure, to the casting cavities. An ingate channel 32 communicates the sprue channel with each of the casting cavities 20 and 21. Here, the ingate channel is defined in only one of the die members of each pair and has a tapered cross-section to promote streamlined flow to the cavity.

Means 30 is employed to carry molten metal to the sprue channel, such means having a piston 31 for applying the desired force to generate the proper amount of hydraulic pressure to fill the cavities.

In operation, the series of die members are forced together (as shown in FIG. 3) with a clamping force applied by way of the clamping means 24 which urges platen 22 in a direction against platen 23 along the axis 17. When the die members are in a closed condition, molten metal is injected under pressure through the entrance opening 30a to the cavities, such pressure being in the general range of 10,000–12,000 psi. The locking tonnage here applied for this specific embodiment is about 600 tons (600 tons per cavity), with the projected cavity area being about 120 square inches.

Within a matter of minutes, the metal is solidified due to the chilling of the die members and other means. The pairs of dies are separated one from the other as shown in FIG. 4, which causes a fracture of the solidified metal sprue at 35 (in the abutting plane 26). Such fracture is facilitated by providing the sprue channel with a narrowed neck portion at 35 (at the abutting plane 26) so that a reduced separation force may be utilized to break the sprue at such location.

As shown in FIG. 5, the die members of each pair are then separated, providing a space 36 or 37 to receive the ejected casting 38 (see FIG. 6) and allow it to fall free to a collecting or quenching station. Mechanical ejector arms 39 push the castings into spaces 36 or 37.

The unlocking and separation of the die members is shown specifically in FIGS. 7, 8 and 9. In FIG. 7, the pairs of dies are locked together in a closed condition by way of a lock assembly having an arm 40 and pin 41, the pin 41 being inserted through an opening in the locking arm and in a receptacle opening 47 within the other die member. The locking arrangement prevents the die members of each pair (11 or 12) from separating during the injection cycle of the molten metal. The lock assembly is shown for each pair of die members, one being on the upper surface of one pair of die members 11 and the other being on the lower surface of the other pair of die members 12.

The arm and lock pin remain tightly engaged, keeping the pairs of dies in a closed condition during the first stage of separation of the die assembly (shown in FIG. 8). In this stage, the movable platen 22 is forcibly pulled away, separating the pairs 11-12 of dies and creating a space 48 between the pairs of die members. Machine tie bars 55 extend through the dies to guide movement and to facilitate clamping (see FIG. 2). During this first separating movement, the force applied to the platen causes the solidified metal sprue to fracture at 35 in the abutting plane 26.

To separate the die members and allow for the ejection of the solidified casting, limit pull bars 51-52 are employed. They extend oppositely inwardly and each bar is attached to a platen, one pull bar 51 being attached at one end to the movable platen 22, and the other pull bar 52 being attached to the stationary platen 23. Each pull bar has a shoulder 53 and 54, respectively, adapted to engage a complementary shoulder 56 defined within one of the die members of each pair. When the pin locks are disengaged and the shoulders of the pull bars engage the complementary shoulder 56, due to further movement of the movable platen, a space 37 or 36 is created between the dies of each pair and the die members separate. Die member 13 moves with the movable platen, and the other die member 14 moves in spaced relationship with the permanent platen 23. The castings 38 are then ejected by means 39 (shown in FIG. 6) by an automatic sequence.

I claim:

1. A multiple casting die assembly for use in a die casting process, comprising:
   (a) independent plural pairs of mating die members abuttingly arranged in series to meet at abutting planes along a predetermined clamping axis, the die members of each pair having walls defining mating casting cavity portions meeting at a parting plane, said abutting planes and parting planes being parallel to each other and normal to said clamping axis;
   (b) means defining a sprue channel for simultaneously communicating with each said cavity portions, said sprue channel extending through said pairs of die members and perpendicular to said parting planes; and
   (c) means for selectively clamping said members together in said series arrangement and along said axis and for forceably separating said pairs of die members to break the cast metal in said sprue at said abutting planes remote from said parting planes and to sequentially separate said die members within each pair at said parting planes, the separation means comprising opposed pull bars, each secured to a platen and having a shoulder at its outermost extremity, said shoulder of each pull bar engages one die member of the pair of die members opposite the platen to which the pull bar is secured, and a lock means to hold each of said pairs of die members together while the platens are moved apart, thus the pairs of die members are separated first along said abutting planes, upon reaching a predetermined distance between the platen and the opposite pair of die members the shoulder engages said one die member causing said one die member to remain at that position while separation along the parting plane occurs upon further separating movement of said platens.

2. The assembly as in claim 1, in which said means defining a sprue channel provides a narrowed neck for said sprue at each of said abutting planes to facilitate fracture upon forceable separation of the die members of each pair.

3. The assembly as in claim 1, in which means (c) is effective to sequentially separate said pairs of die members prior to separating the die members within each pair.

* * * * *